UNITED STATES PATENT OFFICE.

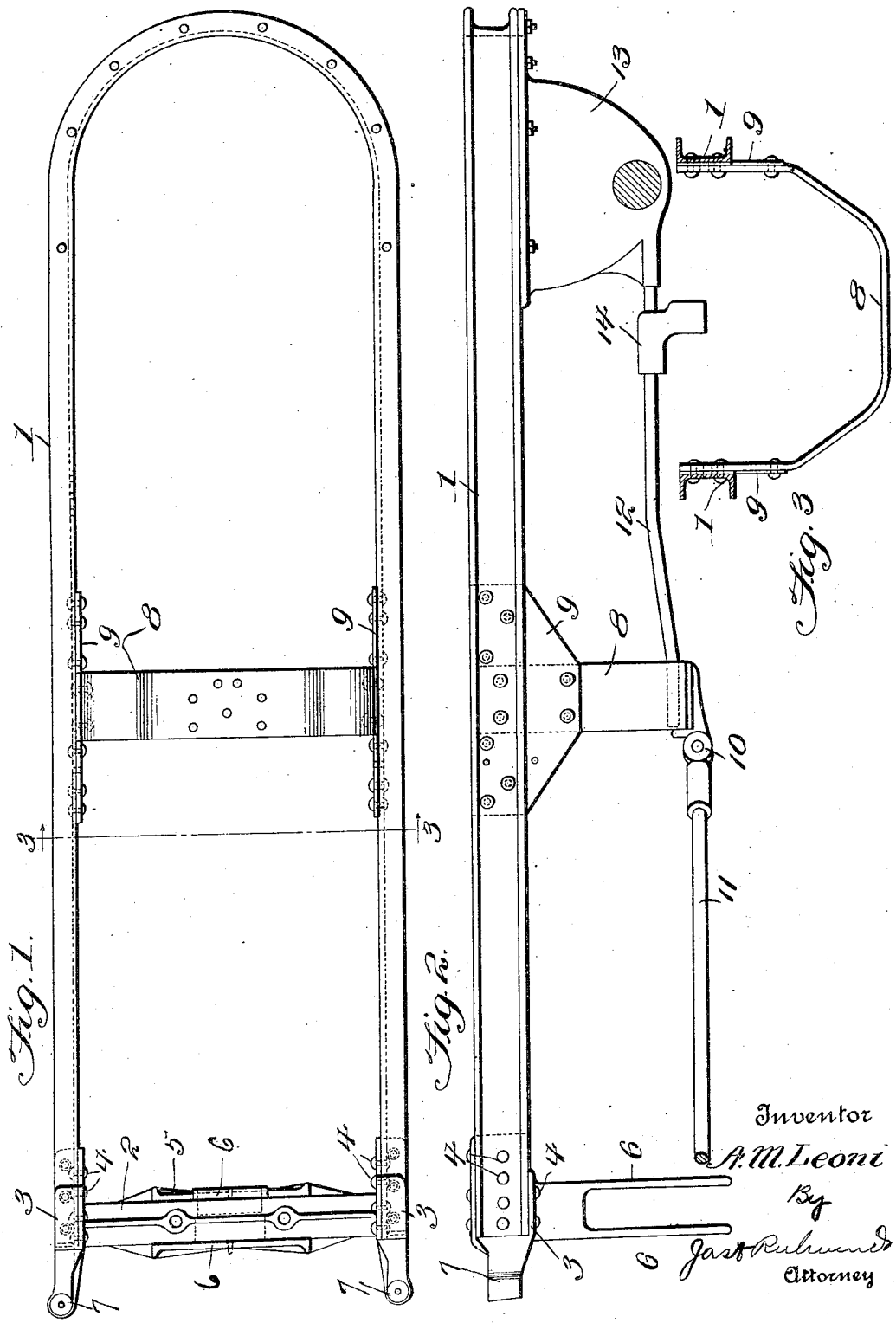

ALFONSO M. LEONI, OF PHILADELPHIA, PENNSYLVANIA, ASSIGNOR, BY MESNE ASSIGNMENTS, TO STEINMETZ ELECTRIC MOTOR CAR CORPORATION, OF BALTIMORE, MARYLAND, A CORPORATION OF MARYLAND.

VEHICLE FRAME CONSTRUCTION.

1,415,372.        Specification of Letters Patent.     Patented May 9, 1922.

Application filed March 12, 1920. Serial No. 365,282.

*To all whom it may concern:*

Be it known that I, ALFONSO M. LEONI, a citizen of the United States, residing at Philadelphia, in the county of Philadelphia and State of Pennsylvania, have invented certain new and useful Improvements in Vehicle Frame Constructions, of which the following is a specification.

This invention relates to a frame construction for motor vehicles, and particularly tractors, and is directed to an arrangement and form of parts which will provide for the maximum strength and rigidity with the minimum of weight.

The improved frame construction comprises a main frame member of hair-pin shape, with the rounded rear end conforming to and providing a support for a particular type of rear axle housing. The forward ends of the main frame member are connected by a cross member, constructed to provide for a three-point suspension support for the motor, means for connecting thereto any type of three point suspension axle, and means for the support of the usual radiator. An intermediate cross member provides for the connection thereto of the swivel head for the front axle radius rods, and also for the connection of a rigid brace strap leading to the rear axle housing. The brace strap provides a support for the usual draw-bar member.

The invention in the preferred form of details is shown in the accompanying drawings, wherein:—

Fig. 1 is a plan view of the improved frame construction.

Fig. 2 is a side elevation of the same.

Fig. 3 is a section through the frame in rear of the front cross member.

The improved frame structure, as here shown, comprises a main frame member 1, of channel iron, and of hair pin shape in plan, with the rounded or connected end at the rear. The side bars of the main frame member extend forwardly from the rounded end in substantial parallelism, to thus provide the side and rear structure of such framing.

The forward ends of the side bars of the main frame member are connected by a cross-member 2, which is constructed to provide for the motor support, the axle support, and the radiator support. This cross member 2 has end sections 3 to interfit with the main side bars, bearing against the inner sides of the upright web of such bars, and underlying and bearing against the lower flange of such side bars. The cross member is riveted or otherwise secured to the side bars of the main frame member at the contacting portions, as at 4, and has a straight length extending between the side bars, which is suitably formed at 5 for the support of a three-point suspension motor. Aprons or plates 6 depend from such cross member 2, and are disposed in spaced parallel relation to provide for the connection thereto of any usual type of three point suspension axle. The respective ends of the cross member 2 are integrally formed to provide forwardly extending brackets 7, on which any usual type of radiator may be appropriately fastened and supported.

The side bars of the main frame member are further connected, at a point intermediate their lengths, by an intermediate cross bar 8, which is preferably in strap form and bolted at the ends to the side bars. Preferably a brace plate is secured between the side bars and the ends of the intermediate cross bar, which brace plate, as 9, extends below the cross-bar connection with the side bars, and provides additional holding and bracing surface for the cross bar.

The intermediate cross bar extends below the side bars, and centrally of such cross bar, which central portion is in a plane parallel to the plane of the main frame member, there is connected a swivel head 10 for the front axle radius rods 11. A rear brace strap 12 is also connected at the forward end to the central portion of such intermediate cross bar, such strap 12 extending rearwardly and being terminally secured to or in the rear axle housing 13. The rear axle housing 13 conforms in plan to the rounded end of the main frame member, and is bolted to the flange of such member through the necessary length of such rounded end. The rear axle housing is thus directly supported by the main frame member, and braced against displacement by such main frame member, through the intermediate cross bar and the strap 12. The brace strap between the intermediate cross member and rear axle housing provides a convenient member for the connection thereto of the draw-bar member thereto, as at 14.

The improved frame construction thus provides a rigid unit, braced at points where such bracing members can be utilized as supports and connectors, to thereby afford the maximum strength and rigidity with the minimum weight. No unnecessary weight is added, as the cross bars are provided at the points of most effective bracing for the main member and in turn utilized as supports. The rounded rear end provides for the connection of the rear axle housing thereto, without the necessity of additional weight, through the additional cross members usually required for this purpose.

The front cross bar, not only serves as an effective brace at this point for the main member, but also can be adapted for the engine support, the front axle support, and the radiator support.

Having thus described the invention, what is claimed as new, is:—

1. A frame construction for motor vehicles, comprising a main frame member of hair pin shape with the rounded end at the rear and providing a direct support for the rear axle housing, a cross bar connecting the forward ends of the main frame member, said cross bar forming a motor support and having depending portions to provide an axle support.

2. A frame construction for motor vehicles, comprising a main frame member of hair pin shape with the rounded end toward the rear, a cross bar at the forward end of such member and forming a motor support, a forward axle support, and having projections to provide a radiator support.

3. A frame construction for motor vehicles, comprising a channel-iron main frame member of hair pin shape with the rounded end toward the rear, a cross bar connecting the forward ends of the main frame member and providing for the support of the motor, front axle, and radiator, and an intermediate cross bar for the main member, said intermediate cross member being adapted for the connection thereto of the radius-rod swivel-head for the front axle.

4. A rigid vehicle frame construction, comprising a channel bar of hair pin shape with the rounded end toward the rear, a cross bar secured to the forward ends of such main member and bridging between the same to provide for supporting the motor, front axle, and radiator, an intermediate cross bar secured to such main frame member and depending below the same, the depending portion of such intermediate cross bar permitting the connection thereto of the radius-rod-swivel-head for the front axle, and a brace strap leading to the rear axle housing.

In testimony whereof I affix my signature.

ALFONSO M. LEONI.